TAPE TRANSPORT BRAKE SYSTEM

Filed July 12, 1963 2 Sheets-Sheet 1

GORDON D. SVENDSEN
INVENTOR

BY Robert G. Clay

ATTORNEY

Aug. 10, 1965 G. D. SVENDSEN 3,199,801

TAPE TRANSPORT BRAKE SYSTEM

Filed July 12, 1963

2 Sheets-Sheet 2

GORDON D. SVENDSEN
INVENTOR.

BY Robert G. Clay

ATTORNEY 3,199,801

TAPE TRANSPORT BRAKE SYSTEM

Gordon D. Svendsen, San Carlos, Calif., assignor to Ampex Corporation, Redwood City, Calif., a corporation of California Filed July 12, 1963, Ser. No. 294,526
10 Claims. (Cl. 242—55.12)

This invention relates generally to tape transport equipment and more particularly to improved braking means for use in such equipment.

In the design of braking systems for quality tape transport units, as for example of the magnetic tape type generally used in conjunction with digital data processing equipment, several factors are of extreme importance. Initially, the systems should minimize as much as possible tape damage resulting from braking. Secondly, the system should be capable of bringing the tape to a smooth controlled stop and thirdly, the system should be reliable and substantially maintenance free.

Prior art tape braking systems are usually of the mechanical type utilizing for example, brake shoes, cylinders, or discs to effectively grab either the tape itself or some brake counterpart on the tape reel or drive mechanism. As a rule, such braking results in uncontrolled tape tension during stopping which increases the likelihood of tape damage. Additionally, it results in rapid brake wear which necessitates frequent maintenance to adjust the brake members to compensate for such wear.

In view of the recited deficiencies in prior art braking systems, it is an object of this invention to provide an improved braking system which is capable of effecting controlled tape braking which will neither damage the tape nor cause excessive brake wear.

Generally, quality tape transport units are provided with tension and speed control circuits which respectively are coupled to the pulling motor and holding back motor regardless of the direction of tape movement. When the tape is moved in a forward direction, the takeup reel motor is pulling and the supply reel motor is holding back while when the tape is moved in a reverse direction, the takeup reel motor is holding back and the supply reel is pulling.

In accordance with the present invention, braking is effected by transposing the connections between the control circuits and the motors in response to the initiation of a braking operation. That is, in response to the actuation of a stop button the speed control circuit is connected to the pulling motor while the tension control circuit is connected to the holding back motor. This permits the tape to decelerate under controlled tension. Utilization of this technique, permits tape speed to be reduced to zero without the application of any mechanical braking means.

In order to prevent tape creeping, mechanical brakes are applied in response to a tape speed of zero being detected. By applying mechanical brakes only when the tape speed is zero, virtually all brake wear is eliminated and the necessity of frequent brake adjustment is avoided.

In a preferred embodiment of the invention, forward and reverse memory circuits are provided which respectively indicate whether the tape is being moved in a forward or reverse direction. The operation of the means for transporting the connections between the control circuits and the motors is based on the state of the memory circuits. The states of the memory circuits are set in response to the first mode of operation selected after the tape transport unit is in either the stop or standby mode. That is, selection of a forward direction mode, such as fast forward, record, or reproduce, will cause the forward memory circuit to be locked in a first state which is not cancellable by any subsequent mode selection as long as the tape is maintaining forward motion. Selection of a reverse direction mode such as rewind will cause the reverse memory circuit to lock in a first state. So long as either of the memory circuits is in a first state, the mechanical braking means is disengaged. The memory circuits can be switched to a second state only in response to a zero tape speed indication and the mechanical braking means can be engaged only in response to both of the memory circuits being in a second state.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
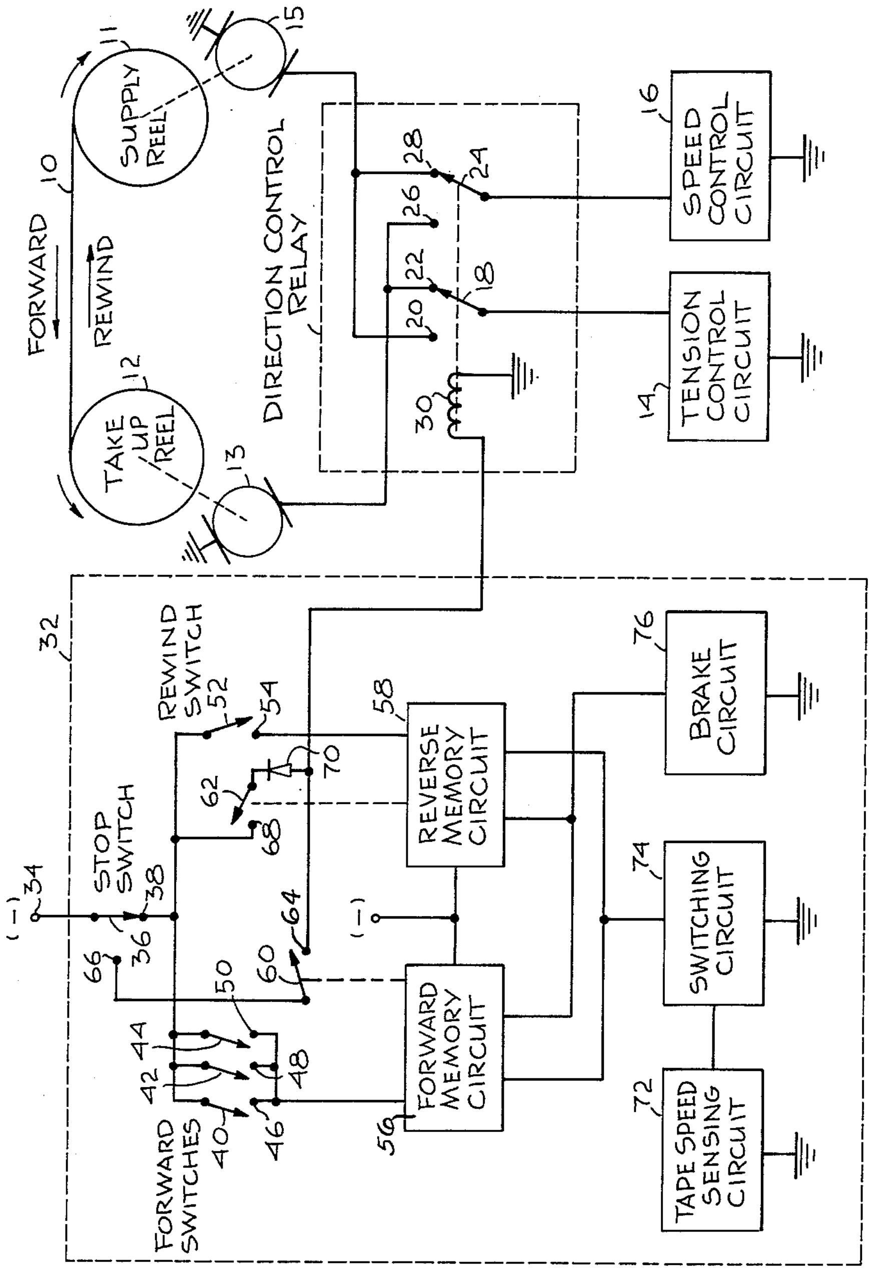
FIGURE 1 is a block diagram of a tape transport unit braking system.

Attention is now called to FIGURE 1 of the drawing which illustrates a tape transport unit braking system in accordance with the present invention. The system is designed to stop the movement of tape 10 traveling in a forward direction, that is from the supply reel 11 to the take-up reel 12, and tape 10 traveling in a reverse direction or from the take-up reel 12 to the supply reel 11.

In quality tape transport units, a conventional tension control circuit 14 and a conventional speed control circuit 16 are provided. The control circuits 14 and 16 are respectively always coupled to the pulling and holding back motors. That is, when the tape 10 is being moved in a forward direction from the supply reel 11 to the take-up reel 12, the tension control circuit 14 is connected to the motor 13 coupled to the take-up reel 12 and the speed control circuit 16 is connected to the motor 15 coupled to the supply reel 11 (not shown). On the other hand, when the tape 10 is being moved in a reverse direction from the take-up reel 12 to the supply reel 11, the tension control circuit 14 is connected to the motor 15 and the speed control circuit 16 is connected to the motor 13.

The means for connecting each of the control circuits 14 and 16 to the motors 13 and 15 comprises a pair of single pole-double throw switches. More particularly, a movable switch contact 18 connected to the output of tension control circuit 14 is associated with a pair of fixed contacts 20 and 22. Similarly, the output of speed control circuit 16 is connected to movable contact 24 which is associated with fixed contacts 26 and 28. Contacts 22 and 26 are connected to the motor 13 and contacts 20 and 28 are connected to the motor 15.

The movable contacts 18 and 24 are ganged together and are responsive to the energization of a relay coil 30. That is, energization of the relay coil 30 will move the movable contacts 18 and 24 from their illustrated position into engagement with the contacts 20 and 26 respectively. Deenergization of the relay coil 30 will cause the movable contacts 18 and 24 to assume the position illustrated.

The portion of FIGURE 1 thus far described operates under the influence of the control portion 32 of the braking system. The control portion 32 includes a source of negative potential connected to terminal 34 which in turns is connected through movable contact 36 of a single pole-double throw stop switch to fixed contact 38. Movable contacts of a plurality of single pole-single throw switches are connected to the contact 38. The plurality of switches may be considered as being comprised of sets of forward and reverse mode switches. More particularly, the forward mode switches include switches having movable contacts 40, 42, and 44 which are respectively adapted to engage fixed contacts 46, 48, and 50. The forward mode switches may respectively comprise a fast forward switch, a record switch, and a reproduce switch. The reverse mode switch includes a rewind switch having a movable contact 52 adapted to engage fixed contact 54. Actuation of any one of these switches energizes appropriate components (not shown) in the tape transport unit to initiate operation in the selected mode. Only one of the mode switches should be closed at any one time and mechanical coupling means can be introduced to assure operation in this manner.

Contacts 46, 48, and 50 are connected to the input of a forward memory circuit 56 while contact 54 is connected to the input of a reverse memory circuit 58. The forward and reverse memory circuits 56 and 58 respectively control the operation of movable contacts 60 and 62. Movable contact 60 is connected to fixed contact 66 and is adapted to engage fixed contact 64 which in turn is connected to a first terminal of relay coil 30. Fixed contact 66 is adapted to be engaged by movable switch contact 36 previously referred to. Movable contact 62 is adapted to engage fixed contact 68 which is connected to previously referred to contact 38. In addition the movable contact 62 is connected to the cathode of a diode 70 whose anode is connected to the first terminal of relay coil 30.

In addition to the aforedescribed connections, three additional circuits are respectively connected to the forward and reverse memory circuits 56 and 58. More particularly, a tape speed sensing circuit 72 is connected through a switching circuit 74 to both the forward and reverse memory circuits 56 and 58. Additionally, a brake circuit 76 is connected to the forward and reverse memory circuits 56 and 58.

Before proceeding with a detailed explanation of the implementation and operation of the control portion 32, brief reference will be made to the operation of the entire braking system as shown in FIGURE 1. In response to the closure of any one of the forward mode movable switch contacts, the tape 10 will be moved in a forward direction and the forward memory circuit will be driven to a first state. In response to subsequent closure of any of the other forward mode switches, the state of the forward memory circuit will not be changed. However, in response to actuation of the movable contact 36 of the stop switch, the relay coil 30 will be energized to cause the movable contacts 18 and 24 to engage contacts 20 and 26. As a consequence, the tape will be decelerated under controlled tension. The tape speed sensing circuit 72 functions to indicate when the tape has decelerated sufficiently so that its speed is zero. In response to a zero speed indication, the switching circuit 74 will cause the forward memory circuit 56 to switch to a second state, and in response to both memory circuits 56 and 58 being in a second state, the brake circuit 76 will be energized to cause mechanical brakes to be applied to the tape or tape drive means.

If on the other hand the movable contact 52 of the rewind switch had been initially closed, the relay coil 30 would be energized with the movable contacts 18 and 24 engaged with the contacts 20 and 26. Consequently, the tape 10 would be moved in a reverse direction. In response to the movable contact 36 of the stop switch being engaged with contact 66, the relay coil 30 is deenergized to permit the movable contacts 18 and 24 to engage the contacts 22 and 28. This action will cause the tape movement to decelerate under controlled tension. In response to a zero speed indication provided by the tape speed sensing circuit 72, the switching circuit 74 will cause the reverse memory circuit 58 to assume a second state thereby causing the mechanical brakes controlled by the brake circuit 76 to be applied to the tape or tape drive means.

Figure 2:
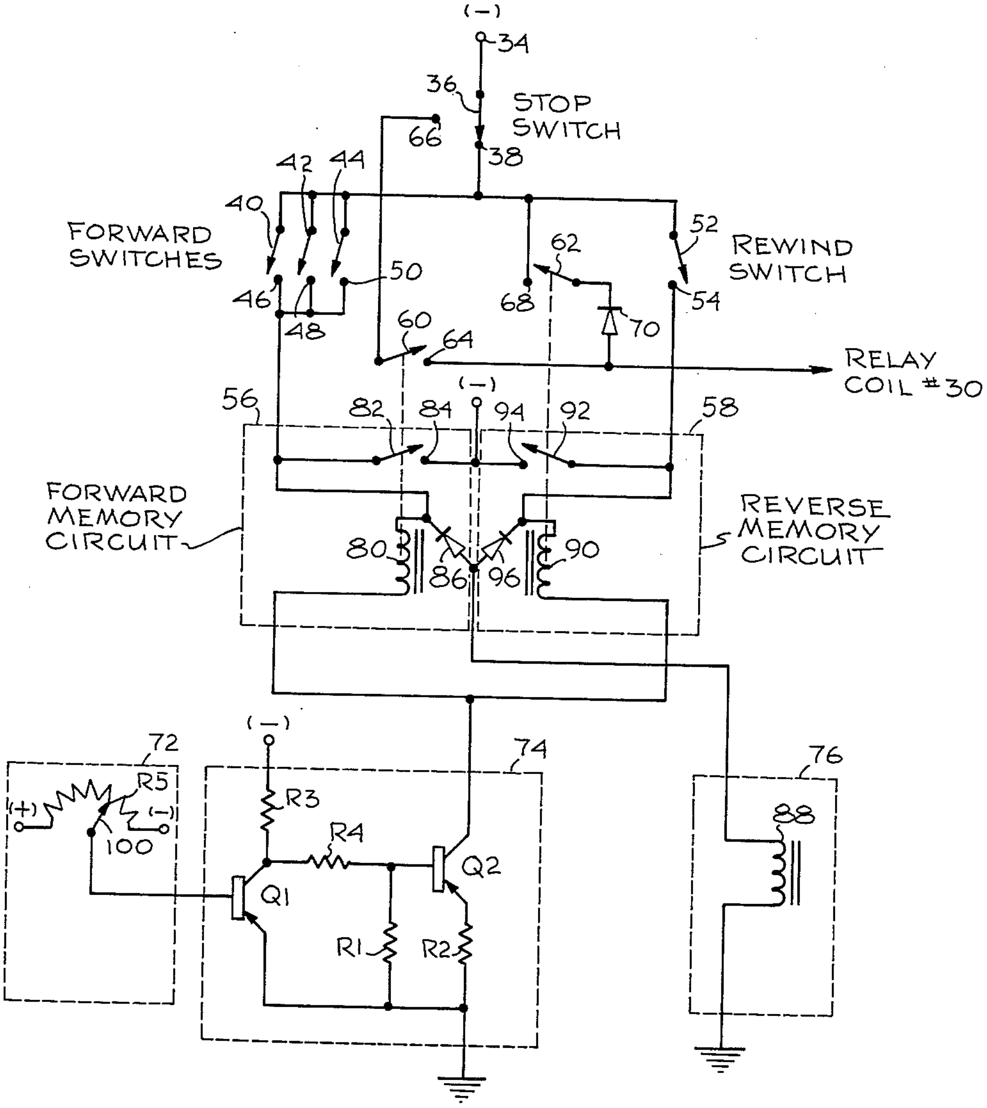
FIGURE 2 is a schematic diagram illustrating the details of the control portion of the braking system.

Attention is now called to FIGURE 2 which illustrates in greater detail the control portion 32 of the braking system of FIGURE 1. The forward memory circuit 56 includes a relay coil 80 whose first terminal is connected to fixed contacts 46, 48, and 50 and whose second terminal is connected to the collector of PNP transistor Q2 of the switching circuit 74. In addition, the first terminal of coil 80 is connected to movable contact 82 adapted to engage fixed contact 84 connected to a source of negative potential. Further, the first terminal of coil 80 is connected to the cathode of diode 86 whose anode is connected to the first terminal of relay coil 88 of the previously referred to brake circuit 76. The second terminal of relay coil 88 is connected to ground.

Similarly, the reverse memory circuit 58 includes a relay coil 90 whose first terminal is connected to the fixed contact 54 of the rewind switch. Additionally, the first terminal of relay coil 90 is connected to movable contact 92 adapted to engaged fixed contact 94 which is connected to a source of negative potential. Further, the first terminal of relay coil 90 is connected to the cathode of diode 96 whose anode is connected to the first terminal of relay coil 88.

Switching circuit 74 includes transistors Q1 and Q2. The base and emitter of transistor Q2 are respectively connected to ground through resistors R1 and R2. The collector of transistor Q1 is connected through resistor R3 to a source of negative potential and through resitsor R4 to the base of transistor Q2. The emitter of transistor Q1 is grounded. The base of transistor Q1 is connected to the output of the tape speed sensing circuit 72.

The tape speed sensing circuit 72 comprises a tachometer of the type including a wound resistor R5 having a first terminal which is connected to a source of negative potential and a second terminal which is connected to a source of positive potential both of which are referred to ground. A movable contact 100 is mechanically coupled to the tape and so long as the tape is moving, regardless of direction, the contact 100 is displaced toward the positive terminal of the resistor R5. When the tape speed is zero however, the contact 100 engages the negative terminal of the resistor R5.

In the operation of the control portion 32 of the tape braking system, let it be initially assumed that one of the forward mode movable switch contacts has been closed thereby energizing relay coil 88 and permitting the tape to move in a forward direction. As a consequence of the tape movement, a positive potential will be applied to the base of transistor Q1 thereby biasing it off. Consequently, the base of transistor Q2 will be negative and it will accordingly be biased on. Relay coil 80 will therefore be energized by a current in the path extending from ground through resistor R2, through the emitter-collector path of transistor Q2, through relay coil 80, through the closed forward mode movable switch contact, through the stop switch movable contact 36 to the source of negative potential connected to terminal 34. As a result of relay coil 80 being energized, ganged movable contacts 60 and 82 will engage fixed contacts 64 and 84 respectively. Relay coil 30 (FIGURE 1) connected to fixed contact 64 will be deenergized so that the movable contacts 18 and 24 assume the position illustrated in FIGURE 1. Closure of the movable contact 82 acts to hold the relay coil 80 in an energized or first state independently of movable contacts 40, 42, and 44.

In response to the actuation of the movable contact 36 of the stop switch, the coil 30 will be energized from ground, through the coil 30, through the movable contact 60 and the movable contact 36. Energization of coil 30 causes movable contacts 18 and 24 to engage fixed contacts 20 and 26 to decelerate the tape as previously described. When the tape speed reaches zero, the potential on the contact 100 and base of transistor Q1 falls to the negative potential thereby forward biasing transistor Q1 and raising the potential of its collector. Consequently, transistor Q2 will be biased off thereby deenergizing relay coil 80 and permitting movable contacts 60 and 82 to open. Opening of the movable contact 82 of course de-energizes coil 88 which permits the mechanical brakes to engage the tape or tape drive means. It therefore can be seen that the tape has been stopped effectively without the utilization of mechanical brakes and that the mechanical brakes have been applied only when the tape speed is equal to zero.

Assume now that the movable contact 36 of the stop switch is actuated when the tape is moving in a reverse direction. It will be recalled that in order to cause the tape to move in a reverse direction, the movable contact 52 of the rewind switch is closed. As a consequence of that closure, relay coil 90 is energized through transistor Q2 in response to transistor Q1 being off-biased as a result of tape movement. Of course, closure of switch contact 52 of the rewind switch also energizes relay coil 88 which permits the tape movement. Energization of relay coil 90 causes the closure of movable contacts 62 and 92. Closure of the contact 62 permits the energization of relay coil 30 through diode 70, and movable contacts 62 and 36. Energization of coil 30 causes movable contacts 18 and 24 to respectively engage contacts 20 and 26. Closure of movable contact 92 causes coil 90 to be maintained energized independently of movable contacts 36 and 52.

When the stop switch is actuated and movable contact 36 engages fixed contact 66, relay coil 30 is immediately deenergized thereby causing the connections between tension and speed control circuits 14 and 16 and the motors 13 and 15 to be transposed to the position illustrated in FIGURE 1. Consequently, the tape is smoothly decelerated. Again, when the tape speed sensing circuit 72 detects that the tape speed is zero, the transistor Q1 is biased on to thereby off-bias transistor Q2. As a result, relay coil 90 is deenergized to thereby cause movable contacts 62 and 92 to open. The opening of movable contact 92 in turn deenergizes relay coil 88 consequently causing the mechanical brakes to be applied.

From the foregoing, it should be appreciated that an improved braking system for tape transport units has been disclosed herein which permits tape speed to be smoothly decelerated to zero, while maintaining tension control over the tape, by transposing connections between the tension and speed control circuits. Utilization of this technique for tape deceleration permits mechanical brakes to be applied only after the tape speed has reached zero thereby eliminating substantially brake wear and considerably reducing brake maintenance requirements.

What is claimed is:

1. In a tape transport unit including first and second reels having first and second motors respectively coupled thereto, a tape length having first and second ends respectively wound on said first and second reels; a tension control circuit; a speed control circuit; means driving said first motor for causing said tape length to wind on said first reel and unwind from said second reel; means connecting said tension control circuit to said first motor; means connecting said speed control circuit to said second motor; and means for braking said tape including means for connecting said tension control circuit to said second motor and said speed control circuit to said first motor.

2. In a tape transport unit including a tape forward mode switch and a tape reverse mode switch; first and second reels having a tape length wound thereon; first and second motors respectively coupled to said first and second reels; a tension control circuit; a speed control circuit; first means responsive to actuation of said forward mode switch for connecting said tension control circuit and said speed control circuit to said first and second motors respectively; second means responsive to actuation of said reverse mode switch for connecting said tension control circuit and said speed control circuit to said second and first motors respectively; a tape stop mode switch; and third means responsive to actuation of said stop mode switch for transposing the connections between said control circuits and said motors.

3. The tape transport unit of claim 2 including first and second memory circuits; means responsive to actuation of said forward mode switch for switching said first memory circuit to a first state; means responsive to actuation of said reverse mode switch for switching said second memory circuit to a first state; said third means being responsive to said first memory circuit being in a first state for connecting said tension control circuit to said second motor and said speed control circuit to said first motor and to said second memory circuit being in a first state for connecting said speed control circuit to said second motor and said tension control circuit to said first motor.

4. The tape transport unit of claim 2 including first and second memory circuits; means responsive to actuation of said forward and stop mode switches for switching said first memory circuit to first and second states respectively; means responsive to actuation of said reverse and stop mode switches for switching said second memory circuit to first and second states respectively; said third means being responsive to said first memory circuit being in a first state for connecting said tension control circuit to said second motor and said speed control circuit to said first motor and to said second memory circuit being in a first state for connecting said speed control circuit to said second motor and said tension control circuit to said first motor; mechanical brake means; a tape speed sensing apparatus; and means responsive to said first and second memory circuits being in said second state and said speed sensing apparatus sensing a tape speed of zero for actuating said mechanical brake means.

5. In a tape transport unit including a tape forward mode switch and a tape reverse mode switch; first and second reels having a tape length wound thereon; first and second motors respectively coupled to said first and second reels; a tension control circuit; a speed control circuit; first means responsive to actuation of said forward mode switch for connecting said tension control circuit and said speed control circuit to said first and second motors respectively; second means responsive to actuation of said reverse mode switch for connecting said tension control circuit and said speed control circuit to said second and first motors respectively; a tape stop mode switch; third means responsive to actuation of said stop mode switch for transposing the connections between said control circuits and said motors; mechanical brake means; a tape speed sensing apparatus; and means for actuating said mechanical brake means in response to said speed sensing apparatus sensing a tape speed of zero.

6. In a tape transport unit including first and second reels having opposite ends of a tape length wound thereon respectively and drive means for rotating said reels in a first direction for unwinding said tape from said first reel and for winding it on said second reel; means for reversing said drive means; mechanical brake means; a tape speed sensing apparatus; and means for actuating said mechanical brake means in response to said speed sensing apparatus sensing a tape speed of zero.

7. In a tape transport unit including a tape forward mode switch, a tape reverse mode switch, and a tape stop mode switch; first and second reels having a tape length wound thereon; first and second motors respectively coupled to said first and second reels; a tension control circuit; a speed control circuit; a first memory circuit; a second memory circuit; sensing means for indicating when the speed of said tape length is zero and when it is not zero; mechanical brake means; first switch means for selectively connecting said tension and speed control circuits to said first and second motors respectively; second switch means for selectively connecting said tension and speed control circuits to said second and first motors respectively; means responsive to actuation of said forward mode switch for actuating said first switch means; means responsive to actuation of said forward mode switch and an indication that the speed of said tape is not zero for switching said first memory circuit to a first state; means responsive to actuation of said reverse mode switch for actuating said second switch means; means responsive to actuation of said reverse mode switch and an indication that the speed of said tape is not zero for switching said second memory circuit to a first state; means responsive to actuation of said stop mode switch and said first memory circuit being in a first state for actuating said second switch means; means responsive to actuation of said stop mode switch and said second memory circuit being in a first state for actuating said first switch means; and means responsive to an indication that the speed of said tape is zero for switching said first and second memory circuits to a second state.

8. In a tape transport unit including a tape forward mode switch, a tape reverse mode switch, and a tape stop mode switch– first and second reels having a tape length wound thereon; first and second motors respectively coupled to said first and second reels; a tension control circuit; a speed control circuit; a first memory circuit; a second memory circuit; sensing means for indicating when the speed of said tape length is zero and when it is not zero; mechanical brake means; first switch means for selectively connecting said tension and speed control circuits to said first and second motors respectively; second switch means for selectively connecting said tension and speed control circuits to said second and first motors respectively; means responsive to actuation of said forward mode switch for actuating said first switch means; means responsive to actuation of said forward mode switch and an indication that the speed of said tape is not zero for switching said first memory circuit to a first state; means responsive to actuation of said reverse mode switch for actuating said second switch means; means responsive to actuation of said reverse mode switch and an indication that the speed of said tape is not zero for switching said second memory circuit to a first state; means responsive to actuation of said stop mode switch and said first memory circuit being in a first state for actuating said second switch means; means responsive to actuation of said stop mode switch and said second memory circuit being in a first state for actuating said first switch means; means responsive to an indication that the speed of said tape is zero for switching said first and second memory circuits to a second state; mechanical brake means; and means responsive to said first and second memory circuits being in a second state for actuating said mechanical brake means.

9. The combination of claim 7 wherein each of said first and second memory circuits includes a relay coil and a control switch connected in series therewith; said control switch being open in response to an indication that the speed of said tape is zero and being closed in response to an indication that the speed of said tape is not zero.

10. The combination of claim 9 wherein said control switch includes a transistor; said speed sensing means comprising a circuit including an output terminal and means for providing a first potential on said output terminal when said tape speed is zero; and means for connecting said sensing means output terminal to said control switch transistor for off-biasing said transistor in response to said first potential applied to said sensing means output terminal.

References Cited by the Examiner

UNITED STATES PATENTS

| | | | |
|---|---|---|---|
| 2,775,407 | 12/56 | Elliott et al. | 242—55.12 |
| 2,923,488 | 2/60 | Gratian et al. | 242—55.12 |
| 3,079,100 | 2/63 | Brown et al. | 242—55.12 |

MERVIN STEIN, *Primary Examiner.*